US009552475B2

(12) United States Patent
Šochman et al.

(10) Patent No.: US 9,552,475 B2
(45) Date of Patent: Jan. 24, 2017

(54) GESTURE RECOGNITION FOR DEVICE UNLOCKING

(71) Applicant: Avast Software s.r.o., Prague (CZ)

(72) Inventors: Jan Šochman, České Budějovice (CZ); Tomáš Sixta, Vršovice (CZ)

(73) Assignees: AVAST SOFTWARE S.R.O., Prague (CZ); CESKE VYSOOKE UCENI TECHNICKE V PRAZE, Prague (CZ)

( * ) Notice: Subject to any disclaimer, the term of this patent is extended or adjusted under 35 U.S.C. 154(b) by 0 days.

(21) Appl. No.: 14/737,353

(22) Filed: Jun. 11, 2015

(65) Prior Publication Data

US 2015/0363589 A1 Dec. 17, 2015

Related U.S. Application Data

(60) Provisional application No. 62/012,137, filed on Jun. 13, 2014.

(51) Int. Cl.
| | |
|---|---|
| *H04B 1/06* | (2006.01) |
| *G06F 21/36* | (2013.01) |
| *G06F 3/0488* | (2013.01) |
| *H04M 1/67* | (2006.01) |
| *G06F 3/041* | (2006.01) |

(52) U.S. Cl.
CPC ............ *G06F 21/36* (2013.01); *G06F 3/0416* (2013.01); *G06F 3/0488* (2013.01); *H04M 1/67* (2013.01); *G06F 2221/2147* (2013.01)

(58) Field of Classification Search
None
See application file for complete search history.

(56) References Cited

U.S. PATENT DOCUMENTS

| | | | | |
|---|---|---|---|---|
| 2008/0136587 A1* | 6/2008 | Orr | ........................ | G08C 19/00 340/5.31 |
| 2011/0167391 A1* | 7/2011 | Momeyer | ............. | G06F 1/1684 715/863 |
| 2015/0015493 A1* | 1/2015 | Hsieh | .................... | G06F 3/0488 345/173 |
| 2015/0138101 A1* | 5/2015 | Park | ...................... | G06F 3/0412 345/173 |

* cited by examiner

*Primary Examiner* — Mohammed Rachedine
(74) *Attorney, Agent, or Firm* — Husch Blackwell LLP (57) ABSTRACT

Systems and methods provide a security function for a device or applications running on a device. A lock tap sequence is entered by a user when the device is to be locked. When the user desires to unlock the device, the user enters a unlock tap sequence. If the lock tap sequence matches the unlock tap sequence, the device is unlocked.

23 Claims, 8 Drawing Sheets

JOINT VARIABLE $\xi t(i, j)$

FIG. 8

GESTURE RECOGNITION FOR DEVICE UNLOCKING

CROSS-REFERENCE TO RELATED APPLICATION

This application claims the benefit of U.S. Provisional Patent Application No. 62/012,137 filed Jun. 13, 2014, the entire disclosure of which is hereby incorporated by reference.

FIELD

The disclosure relates generally to systems and methods for device security, and more particularly, to using gesture recognition to unlock a device.

BACKGROUND

Over time, smartphones have become more capable and their use has increased. With the increasing use of smartphones for everyday tasks also comes the increasing risk of losing sensitive data. One way to protect against such loss is the use of a lock screen to secure a smartphone. A lock screen can be built into the phone (i.e., a "default" lock screen) or it can be a separate application that may be obtained from third parties. While lock screens can provide some security, many users are not satisfied with currently available lock screens. They either provide too little security or require too much effort to be unlocked. Additionally, conventional lock screens that are based on gesture recognition typically suffer from the weakness that if the gesture data is collected from a wet surface or using greasy fingers, the lock screen becomes unusable.

BRIEF DESCRIPTION OF THE DRAWINGS

For a better understanding of the inventive subject matter, reference may be made to the accompanying drawings in which.

DETAILED DESCRIPTION

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, tennis, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Described herein are systems and methods for using tap sequences to unlock a device. While the example features of the disclosure are discussed in the context of smart phones, the systems and methods of the disclosure can be adapted to other devices such as portable music players, tablet computers, or any other device with a touch input device such as a touchscreen interface. A device user may use a favorite song or melody as a tap sequence. It is typically very easy for the user to tap to the rhythm of that melody. For example, people often tap to the rhythm of a song when they hear the song or when they "sing it in their head". In the embodiments described below, a user can tap on the touchscreen to unlock the device. As mentioned before, users are typically very consistent in keeping the rhythm, they can repeat the tap sequence easily. On the other hand, a stranger has difficulty repeating the sequence. A stranger will usually have no idea what song the user is thinking about. Even if the stranger could spot the sequence, which might be quite difficult, he would not be able to repeat it with the same precision as the user can be. As a result, a stranger can be denied access to the device.

Figure 1:
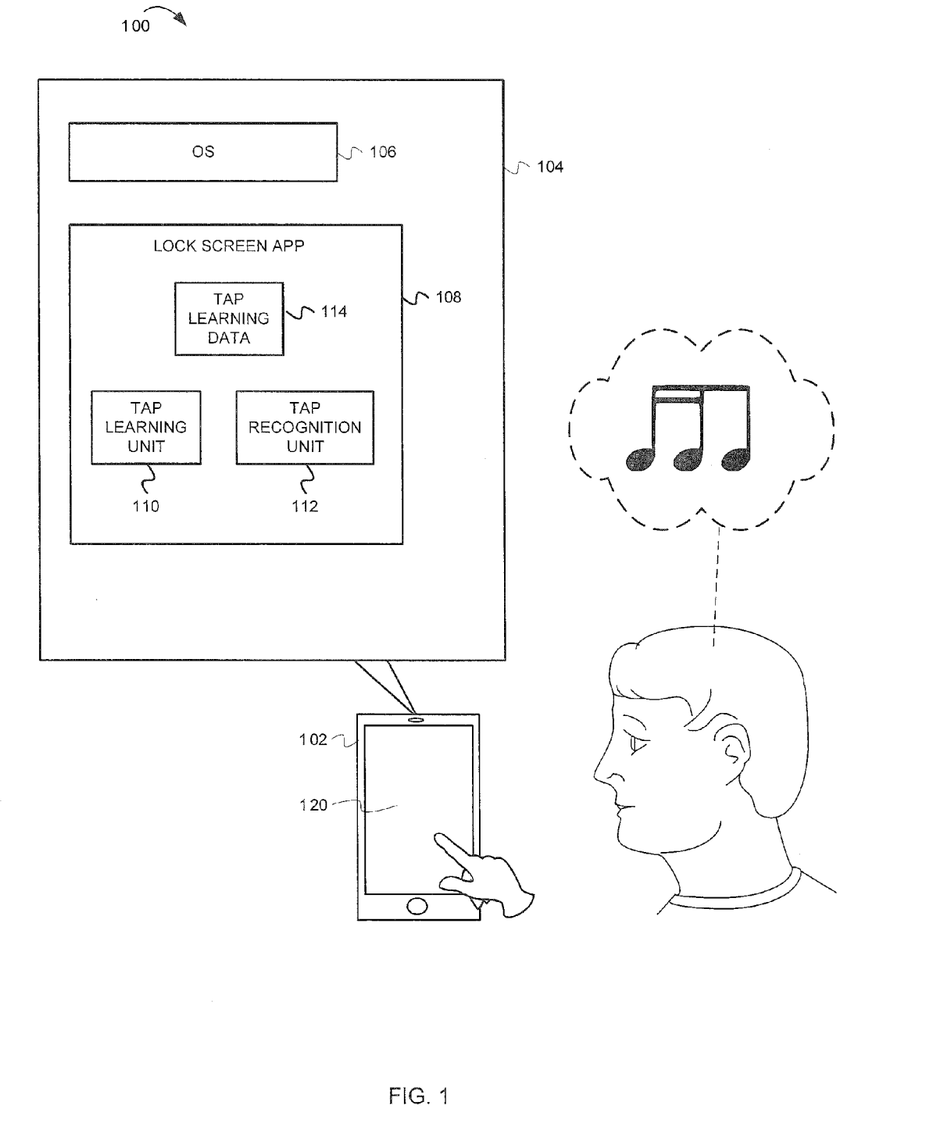
FIG. 1 is a block diagram of an operating environment according to embodiments.

FIG. 1 is a block diagram of an operating environment 100 according to embodiments of the invention. In some embodiments, operating environment 100 includes a device 102 having a software environment 104. Device 102 can be any type of device having a touchscreen 120. For example device 102 can be a smartphone, a tablet computer, a media player (e.g., MP3 player) etc. In addition to display capabilities, touchscreen 120 receives touch input. The data associated with the touch input can include x and y coordinates, pressure and timestamp. In some aspects of the disclosure, x and y coordinates of the touch data are not used, because they are easily influenced by common situations like greasy or shaking hands. Users can typically repeat a gesture (e.g., a tap)—in terms of time and speed very well (even though the coordinates of the touch events may differ significantly). Thus, in some embodiments, the time information received from the touchscreen input is used for determining whether to unlock the device. Touchscreen 120 is one example of a touch input device. Other touch input devices now known or developed in the future may be used to receive touch input.

Software environment 104 comprises a set of software that operates on device 102, and includes operating system 106 and lock screen application 108. Operating system 106 controls execution of applications running on device 102, manages the resources of device 102, and provides interfaces between the applications running on device 102 and hardware components of device 102 (e.g., touchscreen 120). In some embodiments, operating system 106 is the Android™ operating system. However, the embodiments are not limited to any particular operating system, and in alternative embodiments, the operating system 106 can be the iOS® operating system or a version of the Microsoft® Windows® family of operating systems.

Lock screen application 108 can be an application running on device 102 that provides a security function for device 102. Lock screen application 108 can prevent access to applications and services provided on device 102 by unauthorized users. In some embodiments, lock screen application 108 includes a tap learning unit 110 and a tap recognition unit 112. In order to unlock the device 102, a user provides a sequence of taps on touchscreen 120, where the sequence of taps has a rhythm that can be recognized by tap recognition unit 112 as matching a rhythm of a previously entered sequence of taps that was used to lock the device. As an example, a user may tap a rhythm that is based on a melody running in the user's mind.

In some embodiments, in order to lock device 102, the user invokes the lock screen application 108. Tap learning unit 110 receives tap sequence data from touchscreen 120 (e.g., via APIs or other touchscreen interfaces provided by operating system 106). Data derived from the tap sequences may be stored as tap learning data 114.

After entry of the tap sequences, lock screen application 108 can lock the screen and require a user to repeat the tap sequence via tap recognition unit 112 in order for the screen to be unlocked making device 102 available for use.

The domain of protection provided by lock screen application 108 may vary in different embodiments. In some embodiments, lock screen application 108 may protect all of the applications and services on device 102 from unauthorized use. In alternative embodiments, lock screen application 108 may protect a designated application or set of applications from unauthorized use.

Although described as an application, the functionality of lock screen application 108 may be integrated into operating system 106 or within another application. For example, the systems and methods described herein may be provided as part of an application, where, in order to use the application, the user must successfully enter a tap sequence that matches an earlier entered tap sequence.

Figure 2:
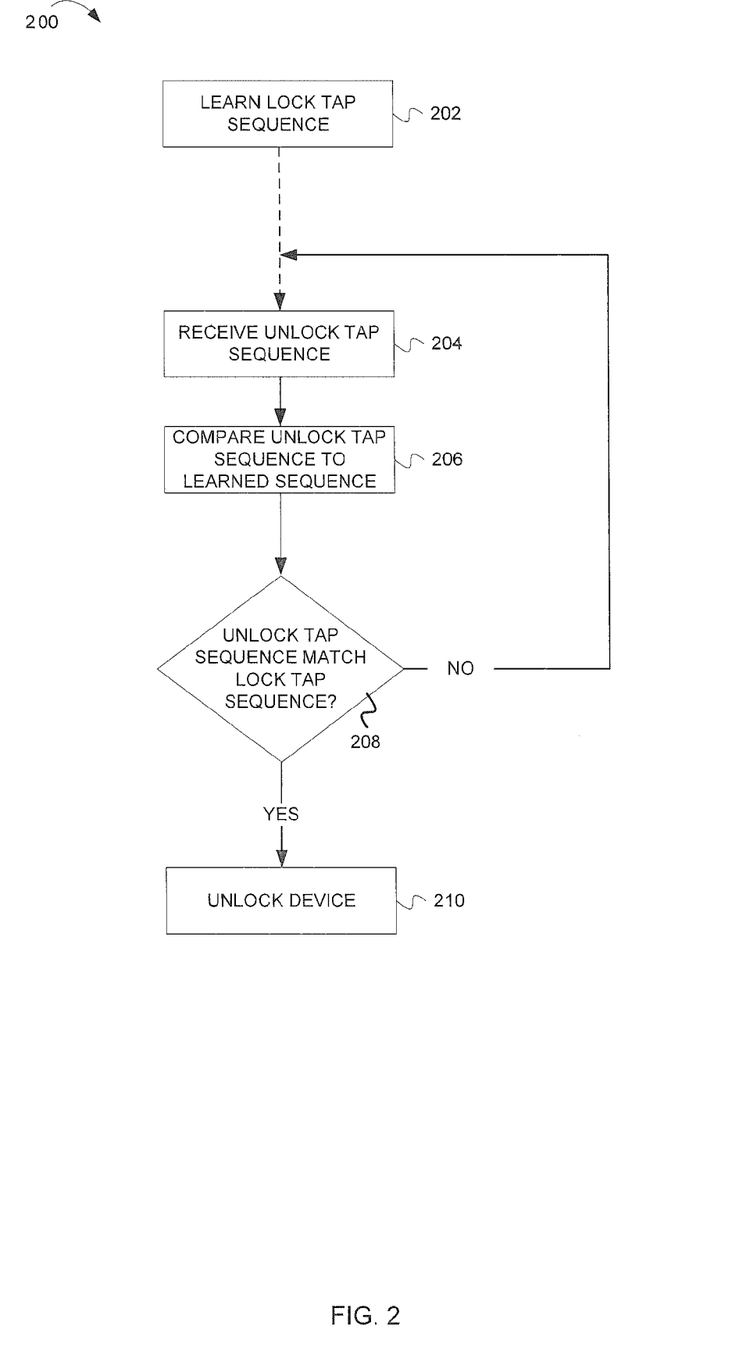
FIG. 2 is a flowchart describing a method for unlocking a device according to embodiments.

FIG. 2 is a flowchart 200 describing a method for unlocking a device according to embodiments. The method may, in some embodiments, constitute computer programs made up of computer-executable instructions. Describing the method by reference to a flowchart enables one skilled in the art to develop such programs including such instructions to carry out the method on suitable processors (the processor or processors of the computer executing the instructions from computer-readable media). The method illustrated in FIG. 2 is inclusive of acts that may be taken by an operating environment 100 executing an example embodiment of the invention.

The operations begin at block 202 with learning a lock tap sequence. A user can provide a lock tap sequence on the touchscreen of a device, where the lock tap sequence corresponds to a rhythm. As noted above, the user may tap a rhythm for a melody that is running through the user's mind. In some embodiments, to reduce the chances of false positives or false negatives, tap learning unit 110 may request that the user repeat entry of the lock tap sequence multiple times. In some embodiments, the user can be asked to enter the same lock tap sequence ten times. When the requested number of lock tap sequences have been entered, the device can be locked.

Later, when a user desires to unlock the device, at block 204 a user interface is invoked that requests that the user enter an unlock tap sequence on the touchscreen of the device.

At block 206, the unlock tap sequence entered at block 204 is compared with the lock tap sequence used to lock the device.

At decision block 208, the system determines if the unlock tap sequence matches the lock tap sequence. If the unlock tap sequence matches the learned lock tap sequence, then at block 210 the device is unlocked. If the unlock tap sequence does not match the learned lock tap sequence, then the method returns to block 204 where the user may be given another opportunity to enter the correct tap sequence.

Tap sequences may be analyzed using any type of algorithm that is suitable for measuring similarity between temporal sequences. Some aspects of the disclosure involve utilize hidden Markov models for tap sequence learning and tap sequence evaluation. While hidden Markov models are used in some embodiments, other algorithms such as Dynamic Time Warping (DTW) may be used in alternative embodiments. An introduction into hidden Markov models and variations used in aspects of the disclosure will now be provided.

Hidden Markov Models

A Hidden Markov model (HMM) is a statistical model used for modeling Markov processes with hidden states. Compared to a Markov model, in which the state at a given time is known, in HMM measurements are observed that have a certain relation to the real states (that are hidden from the observer).

In the discussion below, a notation will be used that is provided in Lawrence R. Rabiner, "A tutorial on hidden markov models and selected applications in speech recognition," *Proceedings of the IEEE*, Vol. 77, No. 2, February 1989, which is hereby incorporated by reference. Using this notation:

$S=\{s_1, \ldots, s_N\}$—set of N hidden states
$V=\{v_1, \ldots, v_M\}$—set of M possible observations
$Q=q_1 q_2 \ldots q_T$—considered state sequence
$O=o_1 o_2 \ldots o_T$—observed sequence t=1, 2, ..., T—time indexes associated with state and observation sequences $a_{ij} \in A^{N \times N}$—$p(q_t=s_{j|qt-1}=s_i)$, transition probability from state $s_i$ to $s_j$ $b_i(v_j) \in B^{N \times M}$—$p(o_t=v_j|q_t=s_i)$, probability of observing symbol $v_j$, given being in state $s_i$ $\pi_i$—probability of being in state $s_i$ at time t=1

In aspects of the disclosure, a hidden state and an observation are a duration between two consecutive touch events relative to the total length of the sequence (details of which are provided below with respect to FIG. 3). A melody in a user's head can be considered a sequence of hidden states and nobody except the user knows it. Touchscreen taps based on that melody can be considered observations.

When using hidden Markov models, three issues that can be resolved are:
1. Determine appropriate state representation and the number of states.
2. Given observed sequence $O=o_1o_2 \ldots o_T$ and a model defined by parameters $\lambda=(A, B, \pi)$, determine the probability $p(O|\lambda)$ of that sequence.
3. Learn optimal set of parameters $\lambda=(A, B, \pi)$, While the state-related settings are typically problem-specific and usually subject to experiments, the other two issues –$\lambda$ optimization and computing $p(O|\lambda)$—can be solved using Expectation-Maximization and Forward-Backward algorithms.

Forward-Backward Algorithm

Consider an observation of a sequence $O=o_1o_2 \ldots o_T$ of length T and, given $\lambda=(A, B, \pi)$, $p(O|\lambda)$, the probability of observing that sequence is determined. A brute-force solution would be to compute it for all possible underlying state sequences Q (of length T) and then sum the results.

Consider a fixed sequence of states $Q=q_1q_2 \ldots q_T$ of length T. Then the probability of observing O given Q and $\lambda$ is $$p(O|Q,\lambda)=b_{q1}(o_1) \cdot b_{q2}(o_2) \ldots b_{qT}(o_T) \quad \text{(equation 1)}$$

Also, the probability of state sequence Q actually happening can be computed:

$$p(Q|\lambda)=\pi_{q1} \cdot a_{q1q2} \cdot a_{q2q3} \ldots a_{qT-1qT} \quad \text{(equation 2)}$$

The joint probability of O and Q (i.e., the probability that Q occurs and it is observed O) is the product of the equations (1) and (2). To compute the probability $p(O|\lambda)$, a sum over all possible sequences Q can be performed, yielding the equation:

$$p(O|\lambda)=\Sigma_Q p(O|Q,\lambda) \cdot p(Q|\lambda) \quad \text{(equation 3)}$$

This solution with time complexity $2T \cdot N^T$ may be unfeasible in some environments, thus some embodiments use a more sophisticated method described below.

Forward Process

A variable can be defined:

$$\alpha_t(i)=p(o_1o_2 \ldots o_t qt=s_i|\lambda) \quad \text{(equation 4)}$$

that represents the probability of observing subsequence $o_1o_2 \ldots o_T$ and being in state $s_i$ at time t. It can be computed recursively. First an initialization can be performed:

$$\alpha_1(i)=\pi_i \cdot b_i(o_1) \quad 1 \leq i \leq N \quad \text{(equation 5)}$$

Then the following recursion can be repeated until $\alpha$ is computed for all times and states:

$$\alpha t1(j)=[\Sigma_{i=1}^N \alpha t(i) \cdot aij] \cdot bj(ot+1) \quad 1 \leq j \leq N \quad \text{(equation 6)}$$

The state $s_j$ at time t+1 can be arrived through N possible states $s_i$, $1 \leq i \leq N$. Since $\alpha_t(i)$ is the probability observing subsequence $o_1o_2 \ldots o_t$ and being in state $s_i$ at time t, then the product $\alpha_t(i)a_{ij}$ is the probability of observing subsequence $o_1o_2 \ldots o_t$ and being in state $s_j$ at time t+1, passing through state $s_i$ at time t. When this product is summed over all possible states $s_i$, $1 \leq i \leq N$, the probability of being in state $s_j$ at time t+1 is obtained considering observations up until time t. Then, by simply multiplying it by observation probability $b_j(o_{t+1})$, the $\alpha_{t+1}(j)$ can be determined.

Backward Process

The backward process is similar. A variable can be defined:

$$\beta_t(i)=p(o_{t+1}o_{t+2} \ldots o_T|q_t=s_i,\lambda) \quad \text{(equation 7)}$$

that represents the probability of observing subsequence $o_{t+1}o_{t+2} \ldots o_T$ when it is known that state $s_i$ exists at time t.

The following values can be set before starting the recursion (the probability of observing empty sequence is always 1):

$$\beta_T(i)=1 \quad 1 \leq i \leq N \quad \text{(equation 8)}$$

Then the values of $\beta$ are recursively computed for all times and states:

$$\beta_t(i)=\Sigma_{j=1}^N (a_{ij} \cdot b_j(o_{t+1}) \cdot \beta_{t+1}(j) \quad 1 \leq t \leq T-1, 1 \leq i \leq N) \quad \text{(equation 9)}$$

Obtaining the Observed Sequence Probability

After $\alpha$ and $\beta$ are computed, they can be used to compute the probability $p(O|\lambda)$. From the definitions above, it can be seen that $$p(O|q_t=s_i,\lambda)=\alpha_t(i) \cdot \beta_t(i) \quad \text{(equation 10)}$$

meaning that the probability of seeing the sequence $o_1o_2 \ldots o_T$ given state $s_i$ at time t is the product of $\alpha_t(i)$ and $\beta=(i)$. The overall sequence probability can be obtained by summing that equation over all possible states $s_i$, $1 \leq i \leq N$ for arbitrary time t.

$$p(O|\lambda)=\Sigma_{i=1}^N \alpha t(i) \cdot \beta t(i) \quad \text{(equation 11)}$$

Since the time t can be chosen, this can be used to further reduce the time complexity by half. Instead of running the whole Forward-Backward algorithm, the fact that $\beta_T(i)=1$ for every i can be used. Therefore, if t=T is chosen, the backward process can be disregarded and the sequence probability can be computed by running only the forward part of the algorithm:

$$p(O|\lambda)=\Sigma_{i=1}^N \alpha T(i) \quad \text{(equation 12)}$$

The time complexity of Forward-Backward algorithm is $TN^2$, which is better than the brute-force solution. Moreover, the variables $\alpha$ and $\beta$ are acquired, which can be useful in an Expectation-Maximization algorithm.

Expectation-Maximization

The Expectation Maximization (EM) algorithm (known as the Baum-Welch algorithm when referring to HMMs) can be used for $\lambda=(A, B, \pi)$ optimization. A training sequence $O=o1o2 \ldots oT$ is given, from which the best possible set of parameters $\lambda$, maximizing $p(O|\lambda)$ can be inferred.

The algorithm includes two stages—E-stage (expectation) and M-stage (maximization). In the E-stage, auxiliary variables can be computed using the results of Forward-Backward algorithm. These auxiliary variables can then used in the M-stage for updating the set of parameters $\lambda$. This whole process is repeated until the local maxima is reached or some other stopping criterion fulfilled.

The EM algorithm only reaches local maxima. One way to deal with this issue is to perform k-fold crossvalidation with random initial values. Alternatively, estimating initial values based on performed experiments or some reasoning can be used in some embodiments to achieve better results (as described below with reference to block 306 of FIG. 3).

Expectation Stage

Two auxiliary variables, state variable and joint variable, are now introduced that can be later used for updating λ.

State variable $\gamma_t(i)=p(q_t=s_i|O, \lambda)$ is the probability of being in state $s_i$ at time t given observed sequence O. This can be computed using the results from the Forward-Backward algorithm.

$$\gamma t(i) = \frac{\alpha t(i) \cdot \beta t(i)}{p(O|\lambda)} = \frac{\alpha t(i) \cdot \beta t(i)}{\sum_{i=1}^{N} \alpha_T(i)} \quad 1 \le t \le T, \quad \text{(equation 13)}$$

$$1 \le i \le N$$

Figure 8:
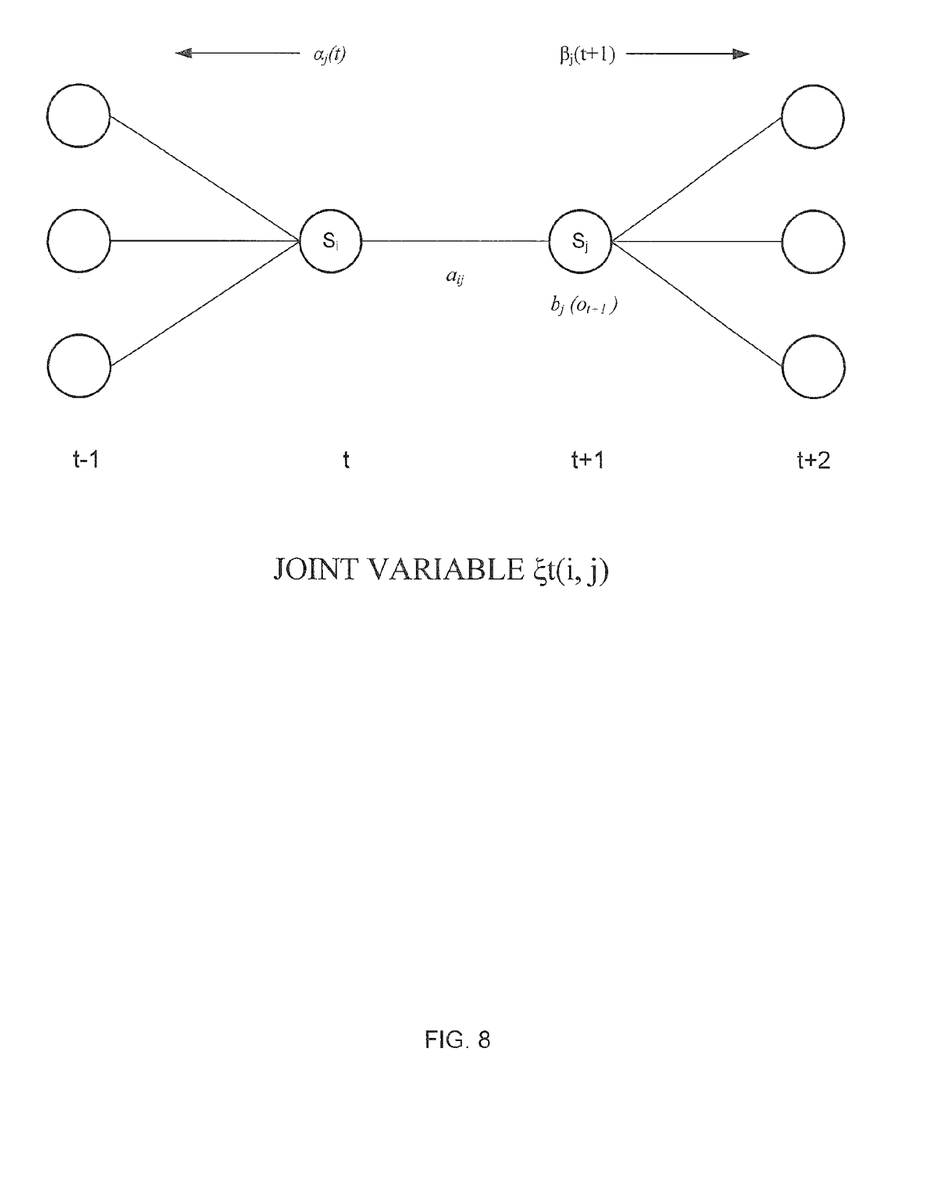
FIG. 8 is a graphical illustration of a joint variable used in embodiments.

Another variable introduced is joint variable $\xi_t(i, j)$. This denotes the probability of being in state $s_i$ at time t and in state $s_j$ at time t+1.

$$\xi_t(i,j)=p(q_t=s_i,q_{t+1}=s_j|O,\lambda) \quad \text{(equation 14)}$$

This can be computed, again using α and β from the Forward-Backward algorithm. FIG. 8 is a conceptual diagram illustrating joint variable $\xi_t(i, j)$.

The probability of being in state $s_i$ at time t, given observations $o_1 o_2 \ldots o_t$ is stored in $\alpha_t(i)$. The probability of observing $o_{t+1} o_{t+2} \ldots o_T$ given state $s_j$ at time t+1 is stored in $\beta_{t+1}(j)$. This can be added with the transition probability from state $s_i$ to $s_j$, $a_{ij}$, and the observation probability of the symbol $o_t+1$ given state $s_j$, $b_j(o_{t+1})$.

$$\xi t(i,j) = \frac{\alpha t(i) \cdot aij \cdot bj(ot+1) \cdot \beta t+1(j)}{p(O|\lambda)} \quad \text{(equation 15)}$$

$$1 \le t \le T-1, 1 \le i \le N, 1 \le j \le N$$

Maximization Stage

The auxiliary variables described above can be used to compute a new $\bar{\lambda}$ from λ. The new sequence likelihood will be at least as high as the current sequence likelihood:

$$p(O|\bar{\lambda}) \ge p(O|\lambda) \quad \text{(equation 16)}$$

The update equations can be derived by solving optimization problem of maximizing $p(O|\lambda)$ given following constraints:

$$\sum_{j=1}^{N} aij = 1 \quad 1 \le i \le N \quad \text{(equation 17)}$$

$$\sum_{k=1}^{M} bj(k) = 1 \quad 1 \le j \le N \quad \text{(equation 18)}$$

$$\sum_{i=1}^{N} \pi i = 1 \quad 1 \le i \le N \quad \text{(equation 19)}$$

That is, rows of A and B sum up to one and initial probabilities π sum up to one, so they actually represent valid probability distributions.

A technique that can be used for this optimization problem is known as Lagrange multipliers. Details of the derivation can be found at "Stephen Tu, Derivation of Baum-Welch Algorithm for Hidden Markov Models" available at the URL people.csail.mit.edu/stephentu/writeups/hmm-baum-welch-derivation.pdf which is hereby incorporated by reference herein for all purposes. The following update formulas are obtained:

$$\bar{a}_{ij} = \frac{\sum_{t=1}^{T-1} \xi t(i,j)}{\sum_{t=1}^{T-1} \gamma t(i)} \quad \text{(equation 20)}$$

$$\bar{b}_j(v_k) = \frac{\sum_{t=1}^{T} \gamma t(j) \cdot d(ot, vk)}{\sum_{t=1}^{T-1} \gamma t(j)} \quad \text{(equation 21)}$$

$$\bar{\pi} i = \gamma t(i) \quad \text{(equation 22)}$$

where d is referred to as an indicator function defined as $d(o_t,v_k)=1$ iff $o_t=v_k$ and $d(o_t,v_k)=0$ iff $o_t \ne v_k$. These formulas work can also be derived by counting event occurrences:

$$\bar{a}_{ij} = \frac{\text{expected number of transitions from state } si \text{ to state } sj}{\text{expected number of transitions from state } si} \quad \text{(equation 23)}$$

$$= \frac{\sum_{t=1}^{T-1} \xi t(i,j)}{\sum_{t=1}^{T-1} \gamma t(i)}$$

$$\bar{b}_j(v_k) = \frac{\text{expected number of times in state } sj \text{ and observing } sysmbol\ vk}{\text{expected number of times in state } sj} \quad \text{(equation 24)}$$

$$= \frac{\sum_{t=1}^{T} \gamma t(j) \cdot d(ot, vk)}{\sum_{t=1}^{T-1} \gamma t(j)}$$

$$\bar{\pi}_i = \text{expected number of times in state } s_i \text{ at time } t=1 = \gamma t(i) \quad \text{(equation 25)}$$

Generally, the algorithm will converge at increasingly slower rate as it approaches the local maxima (as described below with reference to block 308 of FIG. 3). Therefore, a stopping criterion can be used to break the iterations when an acceptable result is achieved. One example of such a stopping criterion is a condition that if two consecutive likelihoods $p(O|\lambda_{iter})$, $p(O|\lambda_{iter+1})$ differ by less than a chosen tolerance ϵ, the algorithm is terminated.

Additional Modifications

In some embodiments, the algorithms introduced above are modified to accommodate aspects of the operating environment.

First, the symbols observed above can be discrete values. However, in a touchscreen environment, continuous measurements are observed (e.g., a tap does not last 1 or 2 seconds, but rather 1.452 s). One possible implementation can be to round the measurements and optionally to increase the state count N. Further, in view of using the EM algorithm, model $b_j(v_k)$ can be modeled as a Gaussian distribution rather than a N×M matrix and then optimize its parameters with the EM algorithm.

Second, the number of training sequences can be limited to only one. Having a single training sequence is undesirable, because it can cause overfitting. Therefore, in some embodiments, multiple training sequences are used for λ optimization.

Continuous Observation Probabilities

In the discussion above, $b_j(v_k)=p(o_t=v_k|q_t=s_j)$ has been considered. Instead, $v_k$ can be considered a continuous measurement rather than a discrete value. As a result, the observation probability can be redefined as following:

$$b_j(v_k)=N(v_k,\mu_j,\sigma_j^2) \quad \text{(equation 26)}$$

where N( ) is the probability density function of the normal distribution and μj and $\sigma_j^2$ are the mean and variance related to state $s_j$.

The learning process described above for the discrete version can be updated for continuous measurements. The updated formula for variable μ is given by:

$$\mu_j = \frac{\sum_{t=1}^{T}\gamma t(j) \cdot ot}{\sum_{t=1}^{T-1}\gamma t(j)} \quad 1 \le j \le N \quad \text{(equation 27)}$$

The mean $\mu_j$ for state $s_j$ is thus a mean of observations weighted by their probabilities of being in state $s_j$ at time t.

A formula for updating σ2 is given by:

$$\mu_j = \frac{\sum_{t=1}^{T}\gamma t(j)\cdot(ot-\mu j)\cdot(ot-\mu j)'}{\sum_{t=1}^{T}\gamma t(j)} \quad 1 \le j \le N \quad \text{(equation 28)}$$

This is very similar to standard formula for variance computation, however here the additions have different weights, again based on the probability $\gamma_t(j)$.

Multiple Training Sequences

The discussion above has considered one training sequence. While that may be acceptable in some cases, to prevent overfitting, all the provided training sequences are used in some embodiments. Equations 24 and 25 can be used to explain the modifications.

As can be seen, the set of parameters λ is a result of counting the observation and transition frequencies. The algorithm can be modified to work with multiple sequences. The formal derivation of these equations can be found in "Xiaolin Li; M. Parizeau; Rejean Plamondon, "Training Hidden Markov Models with Multiple Observations—a Combinatorial Method," *IEEE Transactions on Pattern Analysis and Machine Intelligence*, Volume 22, Issue 4, April 2000, which is hereby incorporated by reference herein for all purposes.

A set of K training sequences can be defined as $O=\{O^{(1)}, O^{(2)}, \ldots, O^{(K)}\}$, where each sequence $O^{(k)}=O_1^{(k)}O_2^{(k)}\ldots O_T^{(k)}$ consists of T observations. Similarly, the superscripts can be used for $\gamma t(i)^{(k)}$, $\xi t(i, j)^{(k)}$ to refer to the variables computed over the particular sequence.

Then the transition probabilities become $$\bar{a}_{ij} = \frac{\sum_{k=1}^{K}\sum_{t=1}^{T-1}\xi t(i,j)^{(k)}}{\sum_{k=1}^{K}\sum_{t=1}^{T-1}\gamma t(i)^{(k)}} \quad 1 \le i \le N, 1 \le j \le N \quad \text{(equation 29)}$$

and the initial probabilities π can be computed as:

$$\bar{\pi}_i = \frac{\sum_{k=1}^{K}\gamma 1(i)^{(k)}}{\sum_{k=1}^{K}\sum_{j=1}^{N}\gamma t(i)^{(k)}} \quad 1 \le i \le N \quad \text{(equation 30)}$$

These are basically the same equations as equations 23 and 25, only this time they are summed over all the training sequences O. The denominator in equation 30 is used to ensure that $\bar{\pi}$ sums up to one.

Finally, the observation probability can be adjusted. Even though continuous observation probabilities are used, the update step includes summing over K training sequences:

$$\mu_j = \frac{\sum_{k=1}^{K}\sum_{t=1}^{T}\gamma t(j)^{(k)} \cdot ot^{(k)}}{\sum_{k=1}^{K}\sum_{t=1}^{T}\gamma t(j)^{(k)}} \quad 1 \le j \le N \quad \text{(equation 31)}$$

$$\sigma_j^2 = \frac{\sum_{k=1}^{K}\sum_{t=1}^{T}\gamma t(j)^{(k)} \cdot (ot^{(k)}-\mu j)\cdot(ot^{(k)}-\mu j)'}{\sum_{k=1}^{K}\sum_{t=1}^{T}\gamma t(j)^{(k)}} \quad 1 \le j \le N \quad \text{(equation 32)}$$

Figure 3:
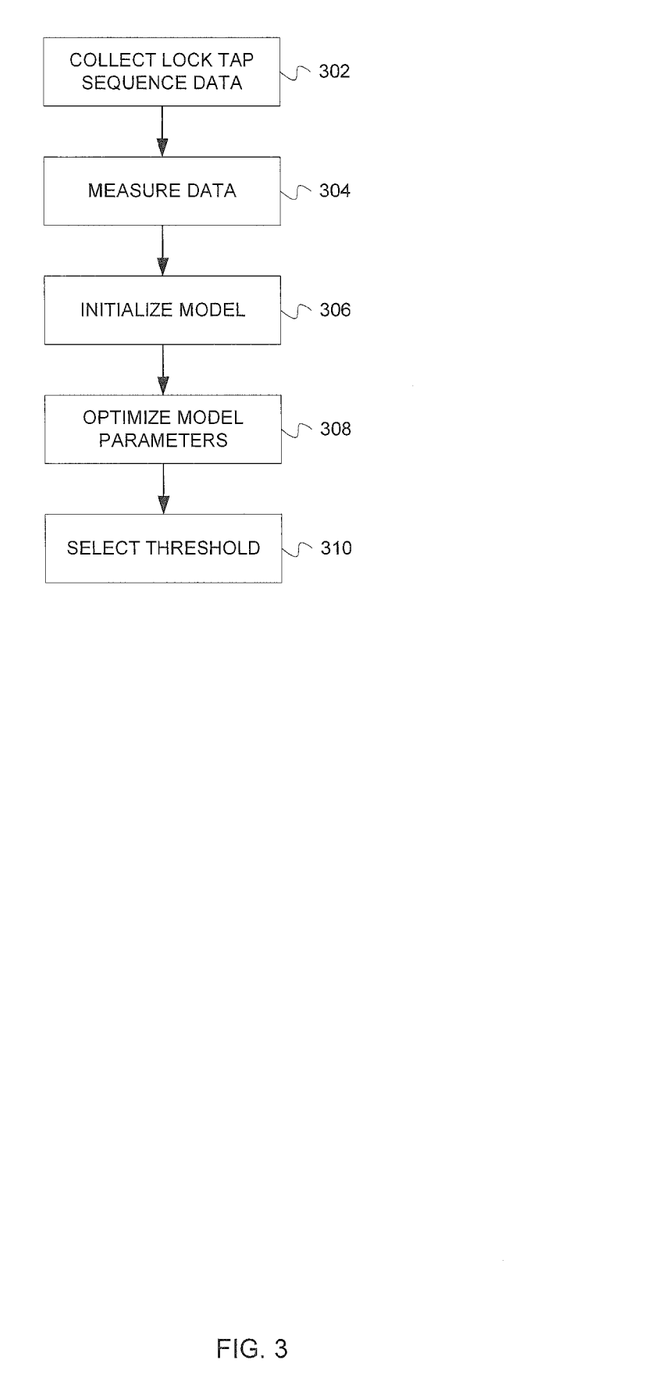
FIG. 3 is a flowchart describing a method for learning a tap sequence.

FIG. 3 is a flowchart 300 describing a method for learning a tap sequence. The method begins at block 302 by collecting a data sequence. In some embodiments, the data sequence can be a series of taps that represent a lock tap sequence. The series of taps can represent a melody that is chosen by a user. The user can tap a touchscreen in accordance with the melody. In some embodiments, the user can be asked to provide multiple sequences of taps for the same portion of the melody. For example, a user may be asked to provide ten sequences of taps for the same portion of the melody. Those of skill in the art having the benefit of the disclosure will appreciate that a user can be asked to provide more or fewer sequences, depending on the desired learning accuracy and tolerance for false negatives or false positives.

Figure 4:
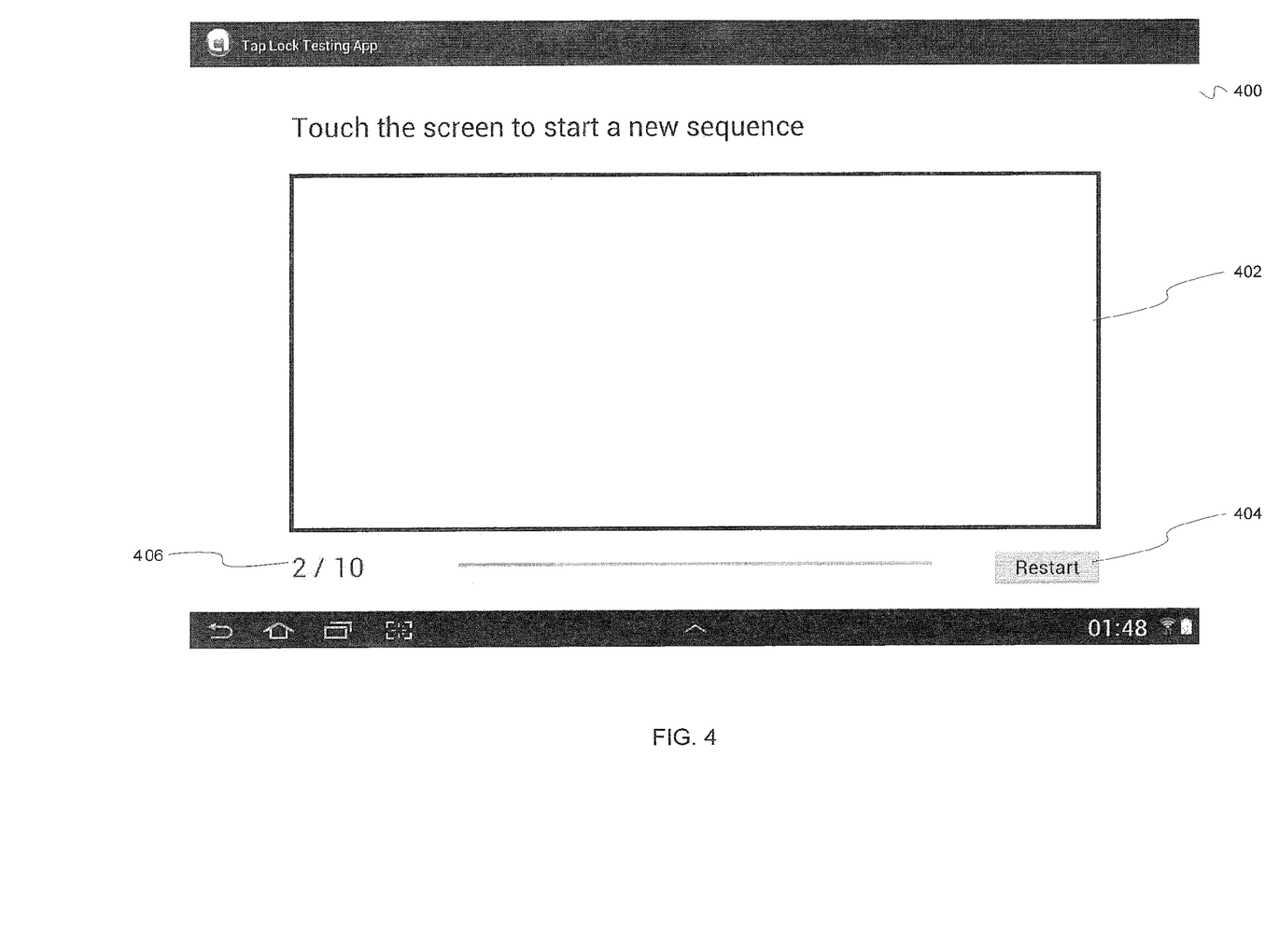
FIG. 4 illustrates an example screen interface.

FIG. 4 illustrates an example user interface 400 for receiving sequences of taps from a user. The user can be prompted to touch the touchscreen to start a new sequence. The user may tap the melody anywhere within area 402 of user interface 400. As the user taps the touchscreen, data representing the taps is collected. A restart button 404 can be included that provides a means for a user to restart a particular sequence from the beginning A counter 406 can be included that shows how many sequences have been received so far.

Returning to FIG. 3, at block 304, the data collected at block 302 is measured. For example, assume that at block 302, a data sequence $D=d_1d_2d_{T+1}$ is collected where a new data point $d_i$ is added whenever a touch event is registered (a finger is lifted up or touches the screen). In some embodiments, the value $d_t$ is the number of milliseconds that elapsed from the first touch event. Then value $d_t$ does not only depend on $d_{t-1}$, but can also depend on all previous values $d_1 \ldots d_{t-1}$. That contradicts the Markov property, which says that the value $d_t$ only depends on the previous value, $d_{t-1}$. Therefore in such embodiments, the sequence D cannot be used as the observation sequence O. Thus in some embodiments, the first derivative of the acquired data sequence D is used. The derivative is defined as follows:

$$o_t = d_{t+1} - d_t \quad \text{(equation 33)}$$

which means that the durations between two consecutive touch events can be used. Sequence $o_1 \ldots o_T$ can then be used as the observation sequence O.

Then in some embodiments, the durations are normalized, so they sum up to 1. This means that the total length of the sequence does not matter, only the rhythm is considered. Then the measurement can be interpreted as a duration between two consecutive touch events relative to the length of the whole tap sequence.

Figure 5:
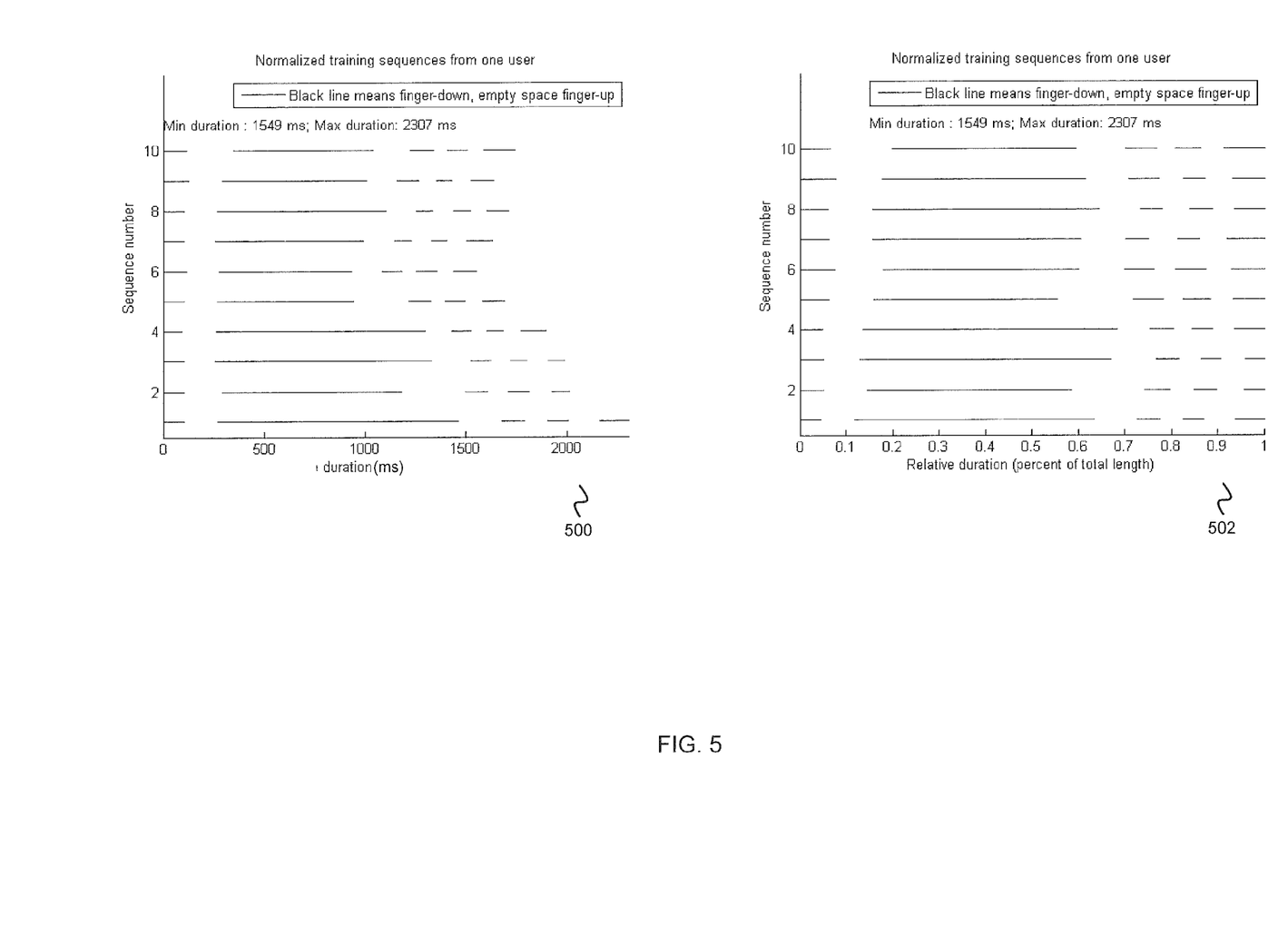
FIG. 5 includes graphs illustrating normalization of data used in embodiments.

FIG. 5 includes graphs illustrating normalization of data used in embodiments. Graph 500 illustrates ten sequences prior to normalization. As can be seen in graph 500, total lengths of the sequences representing the same melody can differ by up to 1 second. The difference in duration can have different causes. For example, in stressed situations, a user may tap the sequence faster than when the user is relaxed. However, the user can still keep the rhythm as illustrated in graph 502. Graph 502 illustrates the data from graph 500 after the data has been normalized as described above.

Returning to FIG. 3, at block 306, an HMM model is initialized. The hidden states, just like observations, represent the duration between two consecutive tap events relative to the total length of the sequence. State $s_i$, $1 \le i \le N$ represents the duration of length i/N.

In some embodiments, N=30 states are used. Other embodiments can use a different number of states. The choice of the number of states to use involves a tradeoff between execution speed and the number of false negatives or false positives. A lower number of states can produce a lower number of false negatives, but also a higher number of false positives. Increasing the number of states can result in fewer false positives and false negatives, but with the algorithm's time complexity of $TKN^2$, where T is the length of the tap sequence, K number of sequences used for learning and N number of states, it can be impractical to use too many states. It has been determined that in some embodiments, a value of N=30 states provides low error rate while maintaining reasonable execution speed.

Initial parameter estimates can also be determined for the HMM. As mentioned above, good initialization can provide better results for the EM algorithm. In some embodiments, observed sequences can be used to set up the transition matrix A, observation vectors $\mu$ and $\sigma^2$ and the initial probabilities $\pi$.

The transition matrix A can be initialized as an empty matrix of size N×N. Then the algorithm iterates through all pairs of observations in all sequences $o_t^{(k)} o_{t+1}^{(k)}$ for $1 \le t \le T-1$ and $1 \le k \le K$. The closest state representations of these observations, $s_i$, $s_j$ respectively, are found: $s_i = \text{round}(N * o_t^{(k)})$ and similarly for $s_j$. The state transition from $s_i$ to $s_j$ is then entered into the matrix A: $A_{ij} += 1$.

Because these are estimates, some tolerance $\epsilon$ can be introduced. This tolerance says that the underlying state $q_t^{(k)}$ of the observation $o_t^{(k)}$ isn't necessarily $q_t^{(k)} = s_i$ (the closest state). The underlying state $q_t^{(k)}$ can rather be $q_t^{(k)} = s_l$, where $i - \epsilon \le l \le i + \epsilon$ and $\epsilon$ is the chosen tolerance. In some embodiments, $\epsilon = 3$ when N=30 states are being used. A lower tolerance can mean that the learning would be too limited by the initial estimates, a higher tolerance can make the initial estimates unnecessary.

To implement this tolerance into the transition probabilities estimates, the matrix A can be smoothed by a Gaussian filter. The width of this filter is given by the chosen tolerance. Variance used for this filter is set as $\sigma^2 = 1$. If the variance of the Gaussian filter is too high, the algorithm converges slowly, but if it is too low, the learning is limited by the initial estimates just like if the tolerance $\epsilon$ was too low. In MATLAB notation, the Gaussian filter can be created as flt=fspecial('gaussian', 2*$\epsilon$+1, 1).

The state-related observation means $\mu = (\mu_1, \ldots, \mu_N)$ and observation variances $\sigma^2 = (\sigma_1^2, \ldots, \sigma_N^2)$ are then initialized following the above-mentioned tolerance. For a given state $s_i$, value $$\frac{i}{N}$$

will most likely be observed. Therefore, $\mu_i = i$ for $1 \le i \le N$. Tolerance is then implemented into the observation probabilities using the observation variances $(\sigma_1^2, \ldots, \sigma_N^2)$.

Observation variances $(\sigma_1^2, \ldots, \sigma_N^2)$ can be initially set to a constant value just like the variance of the Gaussian filter. However, if $(\sigma_1^2, \ldots, \sigma_N^2)$ are set with respect to the given observations, it can lead to faster convergence of the algorithm.

Consider $\rho = \max(\text{var}(o_t^{(k)}))$. Then the initial observation variance can be set as the $t \in T$ $k \in K$ maximal variance among the observed sequences for all states:

$$\sigma_i^2 = \rho, \ 1 \le i \le N.$$

Initial probabilities $$\pi_i = \frac{1}{N}, \ 1 \le i \le N$$

can be set to a constant value. This initial setting typically has no effect on the results or convergence speed, the algorithm will adjust these accordingly after the first iteration.

At block 308, HMM parameters can be optimized. After obtaining the initial estimates, the EM algorithm described above is iteratively executed to tune the parameters and to maximize $p(O|\lambda)$.

Depending on the amount of time it takes for each iteration to complete, it can be desirable to limit the number of iterations in order to reduce the execution time, while still aiming for the best possible precision. In some embodiments, a stopping criterion is used. As long as the algorithm converges steeply, the algorithm is allowed to continue to run. If the convergence becomes too slow, the algorithm is terminated. Consider $P_i = p(O|\lambda_i)$ in iteration i. In some embodiments, if $P_{i-4}/P_i > 0.1$, the algorithm is terminated. That is, if the likelihood $p(O|\lambda)$ has not improved at least ten times during the last four iterations, the convergence is considered to be too slow.

At block 310, a threshold is selected. Because only sequences from the genuine user are available, and not from an unauthorized user, it can be useful to perform a cross-validation. In some embodiments, eight sequences are chosen at random and used for HMM training, and then the remaining two sequences are evaluated. This process is repeated ten times, resulting in twenty different likelihoods. The two lowest likelihoods are filtered out (presumed to be outliers), and the threshold is then selected as the value of the lowest remaining likelihood divided by ten. Those of skill in the art having the benefit of the disclosure will appreciate that other combinations of sequences can be used for cross-validation. Further alternative mechanisms for determining the threshold can be used.

Figure 6:
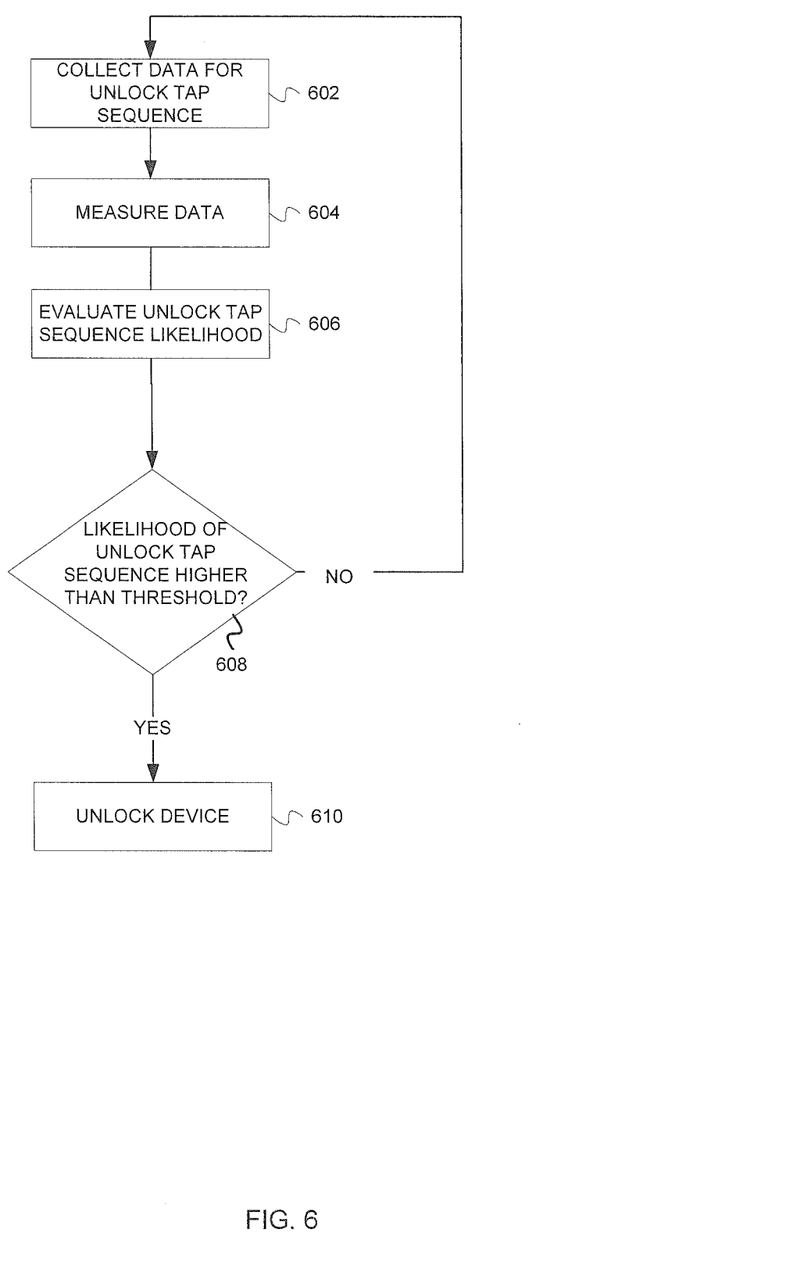
FIG. 6 is a flowchart illustrating further details of a method for unlocking a device.

FIG. 6 is a flowchart 600 illustrating further details of a method for unlocking a device. At block 602 data for an unlock tap sequence is collected. The user can provide the unlock tap sequence in a user interface similar to that illustrated in FIG. 4. In some embodiments, the user interface does not include any indicators that would help an unauthorized user to spot the sequence.

At block 604, the data representing the unlock tap sequence is measured. The data can be measured in the same manner as described above in block 304 (FIG. 3).

At block 606, the likelihood of the unlock tap sequence is evaluated. In some embodiments, the likelihood is evaluated as described above under the heading of "Obtaining the Observed Sequence Probability."

At block 608, a check is made to determine if the likelihood of the unlock tap sequence is higher than the previously selected threshold. If so, then at block 610 the device is unlocked, otherwise the access to the device is denied. The method can return to block 602 to await entry of a new unlock tap sequence.

Figure 7:
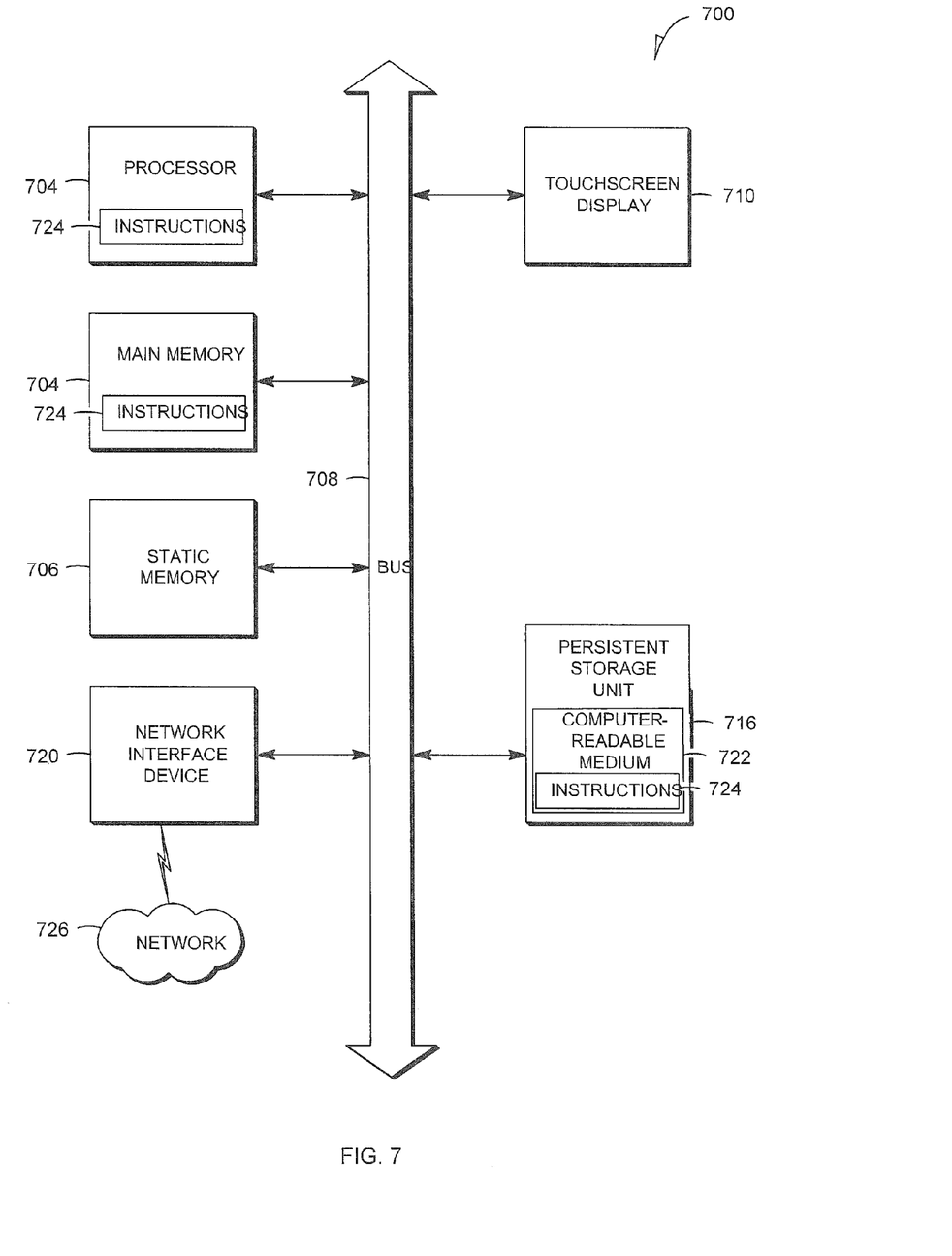
FIG. 7 is a block diagram of an example embodiment of a computer system upon which embodiments of the inventive subject matter can execute.

FIG. 7 is a block diagram of an example embodiment of a computer system 700 upon which embodiments of the inventive subject matter can execute. The description of FIG. 7 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with other computer system configurations, including hand-held devices, multiprocessor systems, microprocessor-based or programmable consumer electronics, network PCS, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a touchscreen display unit 710. In example embodiments, the computer system 700 also includes a network interface device 720.

The persistent storage unit 716 includes a machine-readable medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. A machine-readable storage medium does not include signals.

The instructions 724 may further be transmitted or received over a communications network 726 using a signal transmission medium via the network interface device 720 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A method for securing a device, the method comprising:
   determining a lock tap sequence received via a user interface of a device;
   in response to determining the lock tap sequence, locking the device;
   receiving an unlock tap sequence on the user interface;
   comparing the unlock tap sequence to the lock tap sequence,
   wherein comparing the unlock tap sequence to the lock tap sequence comprises determining a likelihood of the unlock tap sequence with respect to a plurality of tap durations and the lock tap sequence; and
   wherein determining that the unlock tap sequence matches the lock tap sequence comprises determining that the likelihood of the unlock tap sequence is greater than a threshold probability; and
   in response to determining that the unlock tap sequence matches the lock tap sequence, unlocking the device.

2. The method of claim 1, wherein the device comprises a smartphone.

3. The method of claim 1, wherein determining the lock tap sequence includes receiving tap sequence data and normalizing the tap sequence data.

4. The method of claim 1, wherein the lock tap sequence comprises a learned sequence derived from a plurality of tap sequences.

5. The method of claim 1, wherein the lock tap sequence comprises a first plurality of durations between touch events on the device and the unlock tap sequence comprises a second plurality of durations between touch events on the device.

6. The method of claim 1, further comprising:
   normalizing a first plurality of durations between touch events on the device; and
   normalizing a second plurality of durations between touch events on the device;
   wherein the lock tap sequence comprises the normalized first plurality of durations and the unlock tap sequence comprises the normalized second plurality of durations.

7. The method of claim 6, wherein normalizing the first plurality of durations comprises normalizing the first plurality of durations based, at least in part, on a total duration of the first plurality of durations and wherein normalizing the second plurality of durations comprises normalizing the second plurality of durations based, at least in part, on a total duration of the second plurality of durations.

8. The method of claim 1, wherein said determining a lock tap sequence comprises determining a portion of a melody in the mind of a user using the device.

9. A device comprising:
   one or more processors;
   a touch input device coupled to the one or more processors; and
   a machine-readable storage medium coupled to the one or more processors and having instructions stored thereon that, when executed by the one or more processors, cause the device to:
   determine a lock tap sequence received on the touch input device;
   in response to determination of the lock tap sequence, lock the device;
   receive an unlock tap sequence on the touch input device;
   compare the unlock tap sequence to the lock tap sequence,
   wherein the instructions to compare the unlock tap sequence to the lock tap sequence comprise instructions to determine a likelihood of the unlock tap sequence with respect to a plurality of tap durations and the lock tap sequence; and
   wherein the instructions to determine that the unlock tap sequence matches the lock tap sequence comprise instructions to determine that the likelihood of the unlock tap sequence is greater than a threshold probability; and
   in response to a determination that the unlock tap sequence matches the lock tap sequence, unlock the device.

10. The device of claim 9, wherein the device comprises a smartphone.

11. The device of claim 9, wherein determining the lock tap sequence includes receiving tap sequence data and normalizing the tap sequence data.

12. The device of claim 9, wherein the lock tap sequence comprises a learned sequence derived from a plurality of tap sequences.

13. The device of claim 9, wherein the lock tap sequence comprises a first plurality of durations between touch events on the device and the unlock tap sequence comprises a second plurality of durations between touch events on the device.

14. The device of claim 9, wherein the instructions further include instructions to cause the device to:
   normalize a first plurality of durations between touch events on the device; and
   normalize a second plurality of durations between touch events on the device;
   wherein the lock tap sequence comprises the normalized first plurality of durations and the unlock tap sequence comprises the normalized second plurality of durations.

15. The device of claim 14, wherein the first plurality of durations are normalized based, at least in part, on a total duration of the first plurality of durations and wherein the second plurality of durations are normalized based, at least in part, on a total duration of the second plurality of durations.

16. The device of claim 9, wherein said machine-readable storage medium coupled to the one or more processors and having instructions stored thereon that, when executed by the one or more processors, cause the device to determine a lock tap sequence received on the touch input device comprises a machine-readable storage medium coupled to the one or more processors and having instructions stored thereon that, when executed by the one or more processors, cause the device to determine a lock tap sequence that corresponds to a portion of a melody in the mind of a user using the device.

17. A non-transitory machine-readable storage medium having instructions stored thereon that, when executed by one or more processors, perform operations comprising:
- determining a lock tap sequence received via a user interface of a device;
- in response to determining the lock tap sequence, locking the device;
- receiving an unlock tap sequence via the user interface;
- comparing the unlock tap sequence to the lock tap sequence,
- wherein comparing the unlock tap sequence to the lock tap sequence comprises determining a likelihood of the unlock tap sequence with respect to a plurality of tap durations and the lock tap sequence; and wherein determining that the unlock tap sequence matches the lock tap sequence comprises determining that the likelihood of the unlock tap sequence is greater than a threshold probability; and
- in response to determining that the unlock tap sequence matches the lock tap sequence, unlocking the device.

18. The non-transitory machine-readable storage medium of claim 17, wherein determining the lock tap sequence includes receiving tap sequence data and normalizing the tap sequence data.

19. The non-transitory machine-readable storage medium of claim 17, wherein the lock tap sequence comprises a learned sequence derived from a plurality of tap sequences.

20. The non-transitory machine-readable storage medium of claim 17, wherein the lock tap sequence comprises a first plurality of durations between touch events on the device and the unlock tap sequence comprises a second plurality of durations between touch events on the device.

21. The non-transitory machine-readable storage medium of claim 17, wherein the operations further comprise: normalizing a first plurality of durations between touch events on the device; and normalizing a second plurality of durations between touch events on the device; wherein the lock tap sequence comprises the normalized first plurality of durations and the unlock tap sequence comprises the normalized second plurality of durations.

22. The non-transitory machine-readable storage medium of claim 21, wherein normalizing the first plurality of durations comprises normalizing the first plurality of durations based, at least in
- part, on a total duration of the first plurality of durations and wherein normalizing the second plurality of durations comprises normalizing the second plurality of durations based, at least in part, on a total duration of the second plurality of durations.

23. The non-transitory machine readable storage medium of claim 17, wherein said determining a lock tap sequence received via a user interface of a device comprises determining a portion of a melody in the mind of a user using the device.

* * * * *

UNITED STATES PATENT AND TRADEMARK OFFICE
CERTIFICATE OF CORRECTION

PATENT NO. : 9,552,475 B2
APPLICATION NO. : 14/737353
DATED : January 24, 2017
INVENTOR(S) : Jan Šochman and Tomáš Sixta Page 1 of 1

It is certified that error appears in the above-identified patent and that said Letters Patent is hereby corrected as shown below:

(73) Assignees should read: AVAST SOFTWARE S.R.O., Prague (CZ); CESKE VYSOKE UCENI TECHNICKE V PRAZE, Prague (CZ)

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*